United States Patent [19]

Lindaman

[11] 4,208,826
[45] Jun. 24, 1980

[54] BUOYANT PORTABLE TACKLE BOX

[76] Inventor: Glenn H. Lindaman, 230 Driver Pl., Wescoesville, Pa. 18106

[21] Appl. No.: 959,926

[22] Filed: Nov. 13, 1978

[51] Int. Cl.$^2$ .............................................. A01K 97/06
[52] U.S. Cl. .................................. 43/57.5 R; 224/257; 206/811
[58] Field of Search ............ 43/54.5 R, 57.5 R, 25.2, 43/26; 224/26 R; 206/811, 557, 558, 560; 312/270, 271, 272, 272.5, DIG. 33

[56] References Cited
U.S. PATENT DOCUMENTS

| | | | |
|---|---|---|---|
| 2,539,302 | 1/1951 | Fye | 43/54.5 R |
| 2,711,050 | 6/1955 | McIntyre | 43/57.5 R |
| 2,811,276 | 10/1957 | Ray | 43/54.5 R |
| 3,151,790 | 10/1964 | Mavrakis | 43/54.5 R |
| 3,182,872 | 5/1965 | Brosseau | 43/57.5 R |
| 3,201,017 | 8/1965 | Morrissey | 43/57.5 R |
| 4,020,584 | 5/1977 | Michal | 43/57.5 R |

Primary Examiner—Othell M. Simpson
Assistant Examiner—Roscoe V. Parker
Attorney, Agent, or Firm—Ruth Moyerman

[57] ABSTRACT

A watertight, buoyant fishing tackle box designed to be worn by the fisherman strapped to his torso is disclosed. Parallel rows of individual compartment trays containing the appropriate lures, tackle, flies etc. are inserted into a housing cavity from the top. The compartment trays, together with gasket means, form a watertight top for the housing, thereby enhancing the buoyancy of the fisherman should he slip or fall while in the water. In use, the fisherman draws the individual tray upward, out of the housing, where it swings forward resting on a flanged lip of the housing to provide ready access. The trays include a hinged or removable top to allow easy access to its contents.

10 Claims, 6 Drawing Figures

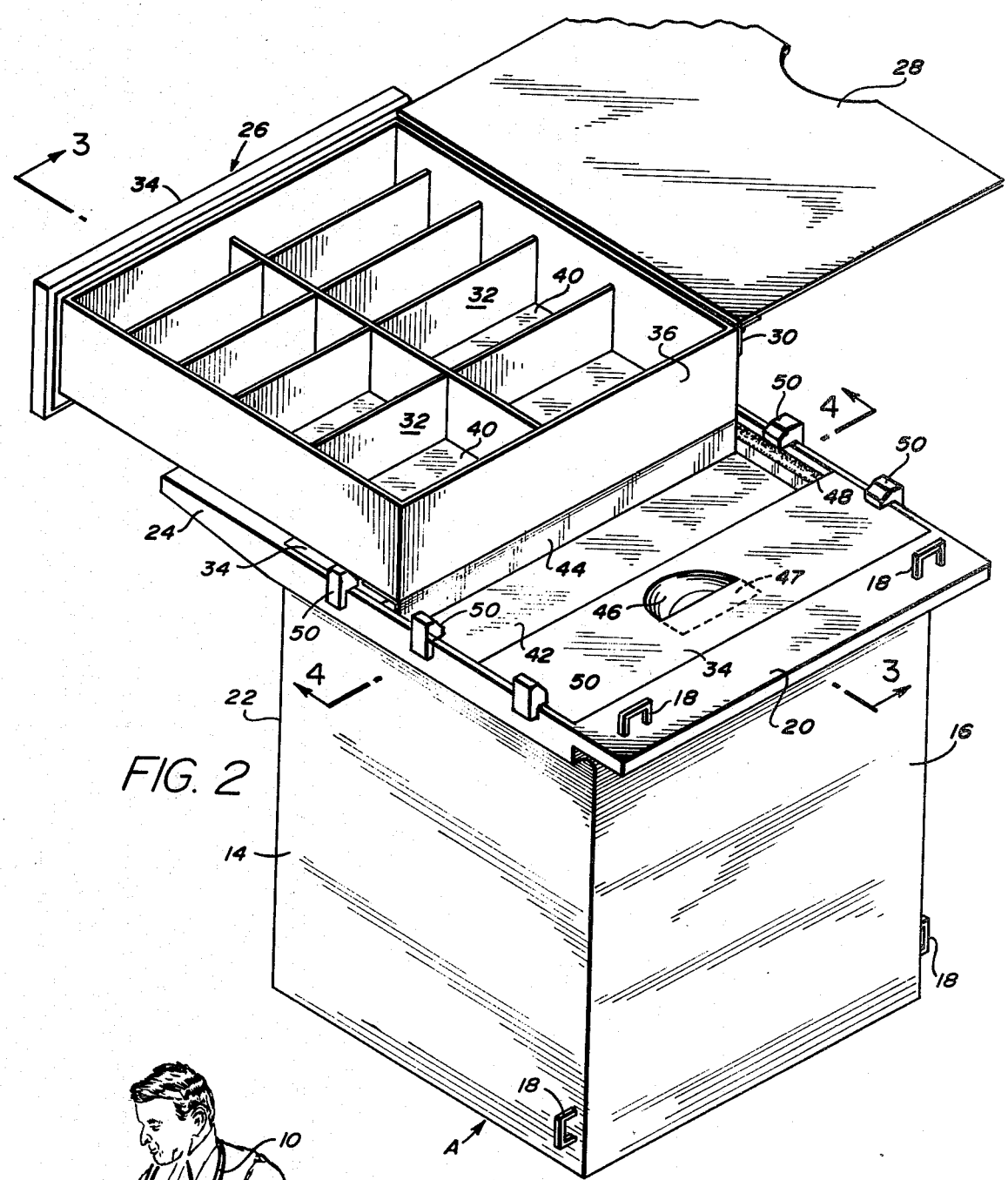
FIG. 1
FIG. 2

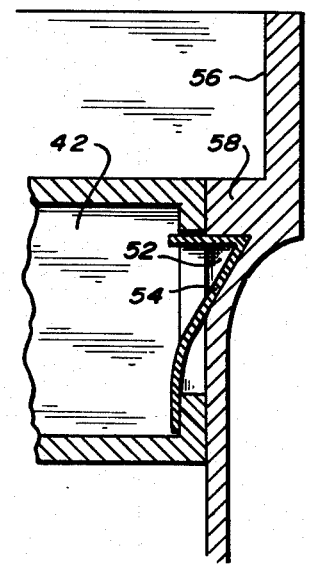
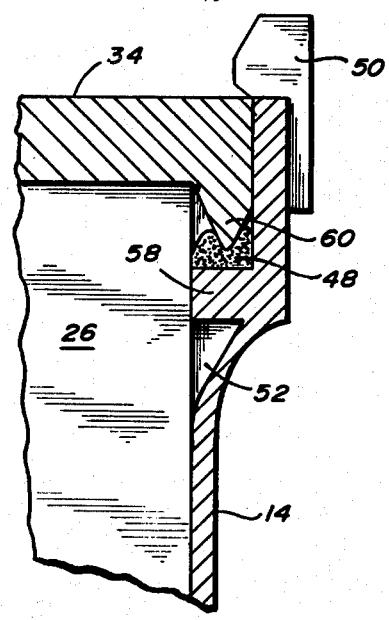
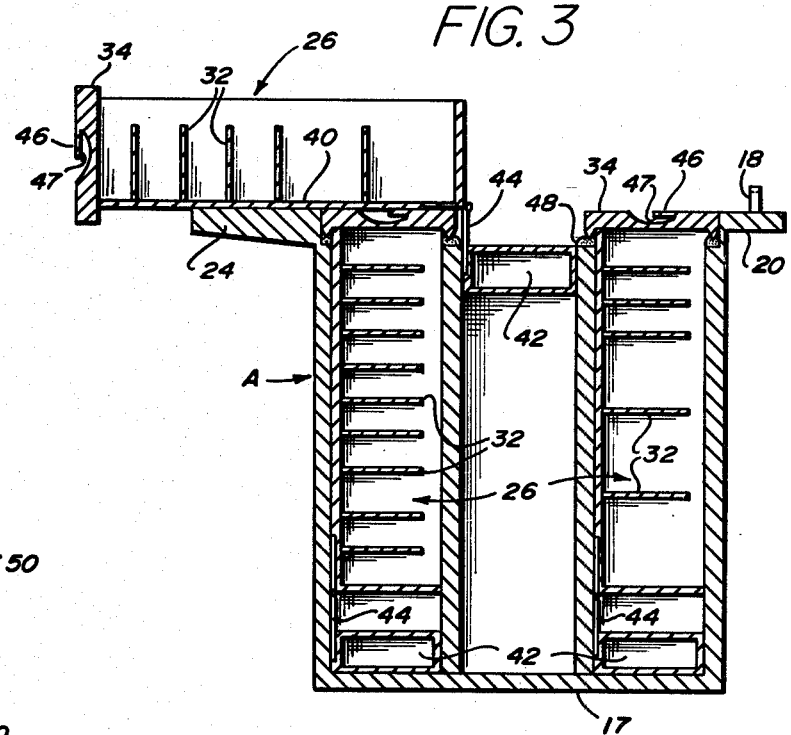
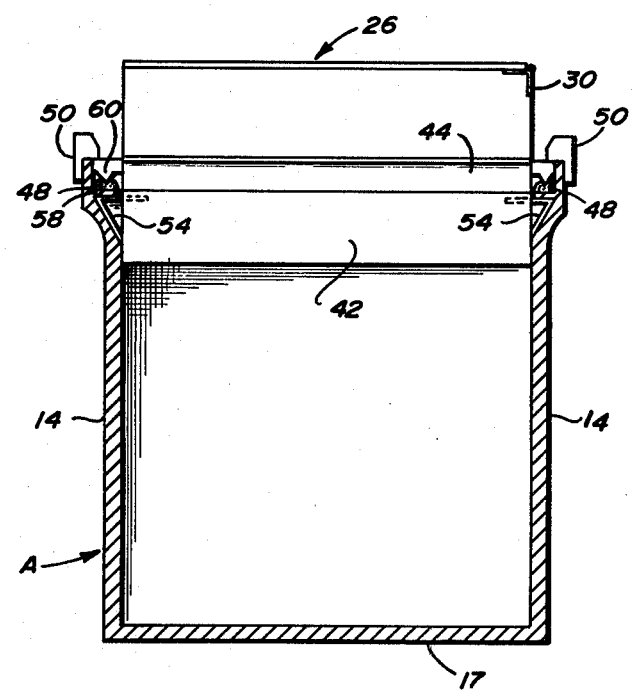

BUOYANT PORTABLE TACKLE BOX

BACKGROUND OF THE INVENTION

1. Field of the Invention

This invention relates to fishing and more particularly to fly and/or hook holders.

2. Description of the Prior Art

Many devices are known whose purpose is to function as a tackle box and contain the myriad of different flies, lures and other tackle popular with the avid fisherman. Fisherman of today commonly own hundreds of these different baits, each with its own particular appeal to the user. The fisherman commonly employs a very large tackle box containing enumerable compartments or trays containing these various lures. This tackle box, because of its size and weight, is usually placed at the shore and the fisherman removes therefrom his individually selected lures of the day and takes these with him as he wades into the water.

Certain tackle boxes are known which are more or less portable; that is, designed to be worn by the fisherman. U.S. Pat. No. 3,151,790 to Mavrakis is an example of this type. Other so-called portable tackle boxes, although not intended to be body worn, are also known. U.S. Pat. No. 4,020,584 to Michal as well as U.S. Pat. No. 3,182,872 to Brosseau are examples of the latter. It has also been recognized that tackle boxes are, generally speaking, heavy and lack buoyancy, thereby easily sinking themselves and contributing to the distress of a fisherman should he lose his balance in the water. U.S. Pat. No. 2,811,276 to Ray provides a hand-carried tackle box with a hinged lid which he alleges provides some buoyancy. However, Ray intends his box to be hand carried and, thus, cannot be used by the fisherman when he is in the water. Furthermore, when open and in use, the interior of the Ray tackle box is totally exposed to the water and, thus, there is no buoyancy in that instance. The design of the Ray box negates good sealing at the joints further limiting its use.

There is, therefore, a great need for a truly portable tackle box, one that is lightweight and designed to be worn by the user while he is in the water and which simultaneously permits ready access to lures and baits contained therein. There is also a heretofore unsatisfied need to provide a body-worn tackle box which will provide buoyancy for the fisherman should he slip and fall while in the water.

SUMMARY OF THE INVENTION

The aforementioned prior art problems are overcome by the portable tackle box of this invention. The instant tackle box has a parallelpipedal-shaped housing with open top which is preferably made of an extruded or formed plastic so as to minimize seams and enhance watertightness.

The housing is designed to receive individual compartmentalized trays which hold the bait, lures etc. The trays are also parallelpipedal in shape but are elongated with hinged or removable tops and are intended to be inserted into the housing, resting therein side by side in parallel rows, the front wall of the trays combining to form a watertight lid for the housing.

The tackle box of this invention is preferably worn by the user by means of shoulder and waist straps which allow the tackle box to be supported on the front upper torso of the wearer. In use, the fisherman grasps the tray of his choice by handle means attached to the tray front wall, pulling the tray upward from the housing. The back wall of the tray is attached to a base along one of its edges. The base and tray slide up and down in the housing but a stop on the base operates to catch and hold the base at the upper edge of the housing to prevent total disengagement of the tray from the housing. The tray is hinged at its connection point to the base and, in its full upward position, the tray may thus be tilted forward by the fisherman to rest against more forward positioned trays, or in the instance of the most forward tray, a flanged portion of the housing. With the tray resting in this forward tilted position, the fisherman has easy access to the tray's compartments which contain his baits and lures by simply opening the hinged tray lid. After the proper bait has been removed from the tray, the tray lid may be closed and the tray easily re-inserted by sliding it back into the housing.

The tackle box of this invention, by its watertight construction, is designed to help buoy the fisherman should he slip and fall while in the water and to this end, the tray tops fit against gasket means and are held in place by flexible clips or other locking means to thereby insure the required watertightness.

It is, therefore, an object of this invention to provide a sealed tackle box of simple and inexpensive construction in which the contents will be protected from the weather and in which the fisherman is provided with extra buoyancy in the event of an accident in the water.

It is still another object of this invention to provide a tackle box that is lightweight and easily supported by shoulder straps, freeing the user's hands for other uses.

It is still another object of this invention to provide a tackle box which includes individual compartmentalized trays in which lures and baits may be held separate and without entanglement with each other.

It is yet another object of this invention to provide a compartmentalized tray which is impossible to remove inadvertently from the housing, but which may be purposefully removed so that other trays containing additional paraphernalia be substituted easily by the fisherman.

These and other objects will be more readily ascertainable to one skilled in the art from a consideration of the following figures, description and exemplary embodiments.

BRIEF DESCRIPTION OF THE DRAWINGS

FIG. 1 depicts the device of this invention when worn by a user.

FIG. 2 is an isometric view of the preferred embodiment showing one tray in an upward, open position.

FIG. 3 is a cross section taken on lines 3—3 of FIG. 2.

FIG. 4 is a cross section taken on lines 4—4 of FIG. 2.

FIG. 5 shows a close-up fragmentary of the base stop in a locked position.

FIG. 6 shows a close-up fragmentary of a tray in a closed, sealed position.

DETAILED DESCRIPTION

Referring now to FIG. 1, a fisherman is illustrated wearing the tackle box of this invention on his front torso suspended from shoulder straps 10 and waist straps 12. FIG. 1 readily demonstrates the ease of access to the tackle box contents by virtue of the user's ability to easily see the tackle box trays by looking downward with a mere bend of the head. FIG. 1 also illustrates that, when one is wearing the tackle box of this invention suspended in the manner shown, the user's hands are free to avail himself of the contents of the tackle box or to hold the fishing rod without interference from the tackle box.

Referring now to FIG. 2, a preferred embodiment of this invention is illustrated in which housing A is shown including side walls 14 and back wall 16. Housing A is preferably parallelpipedal in configuration. Intersections of side, back, front walls and bottom should be sealed or of unitary construction to insure their watertightness. Bails 18 are shown mounted on side wall 14 and lip 20 of back wall 16. Bails 18 are intended to receive a fastening hook extension of shoulder straps 10 and waist straps 12 to allow housing A to be swiftly and easily mounted by the user.

Housing A also includes front wall 22, not visible in FIG. 2, except as to flange 24 which in the preferred embodiment is an extension thereof. Trays 26 are also shown in FIG. 2. One of trays 26 is illustrated in the upright, fully tilted resting position with tray lid 28 opened by virtue of hinge 30 to reveal partitions 32 within its interior. Tray 26, in the raised resting position, is shown supported in this position by flange 24. Trays 26, also parallelpipedal in configuration, include in addition to top 28, front wall 34, back wall 36, side walls 38 and bottom wall 40.

Tray 26 is attached to base 42 along an edge of back wall 36 by means of hinge 44.

Tray front wall 34 includes handle means 46 which are shown as a recess in the tray front wall including finger grip portion 47 in phantom. The user need only to slip one or two fingers under the ledge created by portion 47 to thereby grasp the tray to pull it upward.

Housing A also includes gasket means 48, shown around the inner upper edge of the tackle box housing. Gasket means 48 operates to increase the seal between tray front wall 34 and housing A to enhance the watertightness of the tackle box. Tray locks 50, two for each tray, are also shown in FIG. 2. Tray locks 50 are preferably fabricated of a slightly flexible material such as a piece of plastic or thin metal so that when tray 26 is inserted or removed from housing A, tray locks 50 will simply flex and move aside by the push/pull motion of the operator's hand moving the tray upward and downward.

Referring now to FIG. 3, a cross section on lines 3—3 of FIG. 2 is shown. FIG. 3 better illustrates the interior of the tackle box when one of trays 26 is in the raised position. For example, handle means 46 is more readily visible in FIG. 3 and the utility of flange 24 in supporting tray 26 may be seen. The position of base 42 and its concomitant tray 26 is likewise more readily understandable with reference to FIG. 3.

Referring now to FIG. 4, a cross section on lines 4—4 of FIG. 2 is shown. FIG. 4 shows a back elevation of tray 26 and in particular tray back wall 36. The utility of hinge 44 connecting tray 26 and base 42 is also more readily apparent in this Figure. The design of side walls 14 of housing A illustrates in FIG. 4 the means by which the base may be prevented from disengaging from the housing. Side walls 14 contain, at their upper edge, depression 52 on both sides of the housing into which stop 54 fits when base 42 is in the upward position. Stops 54 may be deformable metal strips fastened on the insides of base 42 and shown extending in the base as is illustrated in phantom. Directly above stops 54 side walls 14 contain an L-shaped depression 56. Leg 58 forms the upper portion of depression 52 and, on its upper side, provides a projecting portion upon which gasket means 48 rests. FIG. 4 also illustrates a side view of tray locks 50 which are more readily discernable by referring now to FIG. 5.

In FIG. 5, tray 26 is shown in the closed position. In the closed position, tray front wall 34 includes, as a projecting portion, detent 60 which presses against gasket means 48 deforming the gasket means to fill the available spaces and sealing tray front wall 34 against side wall 14.

Referring now to FIG. 6, an enlargement is shown to better illustrate the function of stop 54 as it operates to control the upward movement of base 42. In FIG. 6 a view is shown in which tray 26 is in the upright, tilting position and stop 54 on base 42 is shown resting in depression 52. The design of stop 54 and depression 52 is such that stop 54 fits into the depression, catching under leg 58 and effectively arrests the motion of base 42.

There are many variations which may be practiced within the scope of this invention. It should be noted that, although the general dimensions of housing A and trays 26 are as illustrated, this illustration is by no means meant to be limiting and the housing and trays may be of any size and shape so long as they fulfill their intended purpose of being body worn. While it has been illustrated and is preferred that housing A be extruded or molded so as to minimize the seams, such extrusion or molding is not required so long as the points of intersection are adequately sealed.

While shoulder and waist straps are shown attached to lip 20 and side walls 14, such attachment is optional and, in fact, it might be possible to only suspend the tackle box by means of an around-the-neck-type strap.

While three trays are shown inserted in the housing, there is no intention to limit the number of trays to any specific number and any number from one upward is acceptable so long as the overall configuration will support the weight. Likewise, handle means 46 is shown as a depression in tray front wall 34, such a depression is merely preferred in that it allows tray 26 to more readily lie flat in its resting position. Other handle means, which will accomplish this purpose, are within the scope of this invention.

Tray lid 28 and tray back wall 36 are shown hinged, but tray lid 28 may be totally removable or even perhaps eliminated. The hinging connection between tray 26 and base 42 may be of any type of construction including a flexible material so long as the forward tilting of the tray is not hindered.

While the invention has been illustrated utilizing flange 24, such a flange is discretionary and may be eliminated. Where no flange is used, stops 54 would be relied on to prevent the front tray from tilting downward. More rearward trays would rest on the forward trays in this instance.

Gasket means 48 is shown as circumscribing the inner, upper edge of housing A. Additional gasket means may be required between trays 26 and this may be accomplished using transverse braces across the top of the housing or perhaps partitions themselves between trays 26 with a gasket means at the upper edge of the partition. Both of these aforementioned alternatives, as well as others which may be utilized to seal the trays within the housing, are encompassed within the term gasket means. By gasket means is not intended to limit the invention to only a separate discrete gasket attached to the box. Where the materials of construction are such that the touching of pieces are self-sealing and thus form their own gasket, a further gasket may not be necessary. Also intended to be included within the scope of this invention is the alternative where gasket means 48 is attached to tray front wall 34 and detent 60 rests on leg 58.

Stops 54 and locks 50 are shown made of flexible materials such as plastic or metal and operate by simple tension means, but these configurations are intended as illustrative only and other locks and stops which perform similarly are intended to be included within the scope of this invention.

Finally, while trays 26 are illustrated as containing partitions 32, such partitions are optional and others may be substituted including cushions upon which the lures and baits may be fastened, etc.

Having now illustrated and described my invention, it is not intended that such description limit this invention, but rather that this invention be limited only by reasonable interpretation of the apended claims.

1. A tackle box intended to be worn on the person comprising:
    (a) a generally parallelpipedal-shaped housing portion including a bottom, side walls, back wall and front wall sealingly engaging each other at their intersections to form a watertight open top casing;
    (b) a plurality of generally parallelpipedal-shaped compartment trays, each of said trays including a removable lid, a bottom, side walls and a front and a back wall, said trays being of a size and shape to enable their placement in said housing parallel to each other with their back walls resting on said housing bottom;
    (c) a plurality of bases, one for each tray including stops releasably mounted on each of said tray bases to prevent said base from inadvertently being disengaged from said housing, said bases being connected by hinging along one edge to said tray back wall edge to permit said tray, when in the upraised position, to swing frontward;
    (d) handle means associated with said tray front wall to permit the upward drawing of said tray from said housing; and
    (e) gasket means associated with said open top and said tray fronts so that said gasket means, together with said tray front walls, define a sealed, closed top for said housing.

2. A tackle box according to claim 1 wherein said housing side walls include, proximate their upper edge, a depression wherein said tray base stop may catch and rest.

3. A tackle box according to claim 1 wherein said tray stops are constructed of a deformable material.

4. A tackle box according to claim 1 wherein said housing side walls include, at their upper edge, an L-shaped depression of a size and shape to receive and seat said tray front wall.

5. A tacklebox according to claim 4 including, additionally, detent means attached to said housing side wall upper inner edge to releasably engage and sealingly hold said compartment tops within said L-shaped depression.

6. A tackle box according to claim 5 wherein said L-shaped depression is constructed of a material with sufficient elasticity to permit the insertion therein of the tray front wall by the exertion of pressure by the user's hand and arm.

7. A tackle box according to claim 5 wherein said gasket means rests in portion on the transversly projecting arm of said L-shaped depression.

8. A tackle box according to claim 1 wherein said tray front wall includes, on its underneath edge, a projecting portion which engages said gasket means.

9. A tackle box according to claim 1 wherein said housing front wall also includes a flanged upper edge.

10. The tackle box according to claim 1 wherein said housing portion includes tray locking means to secure said trays within said housing.

* * * * *